United States Patent
Mauffrey

[11] Patent Number: 5,947,006
[45] Date of Patent: Sep. 7, 1999

[54] TOASTER WITH MULTIPLE POSITIONS FOR THE BREAD CARRIER

[75] Inventor: Guy J Mauffrey, Breuchotte, France

[73] Assignee: SEB S.A., Ecully, France

[21] Appl. No.: 09/028,058

[22] Filed: Feb. 23, 1998

[30] Foreign Application Priority Data

Feb. 21, 1997 [FR] France .................................. 97 02319

[51] Int. Cl.⁶ .............................. A47J 37/08; H05B 1/02
[52] U.S. Cl. ...................... 99/327; 99/329 P; 99/329 RT; 99/389; 99/391; 219/492; 219/592
[58] Field of Search ............................ 99/389–391, 385, 99/393, 326–333, 396, 400–402; 219/492, 494, 506, 411, 413, 481, 489, 521, 525, 528; 396/365, 373

[56] References Cited

U.S. PATENT DOCUMENTS

| | | | |
|---|---|---|---|
| 2,503,960 | 4/1950 | McCullough | 99/327 |
| 2,673,516 | 3/1954 | Reichold | 99/327 |
| 2,878,748 | 3/1959 | Stanek | 99/329 P |
| 3,869,970 | 3/1975 | Eagle | 99/329 RT |
| 3,956,978 | 5/1976 | Borley | 219/502 |
| 4,154,151 | 5/1979 | Mochizuki | 99/329 R |
| 4,188,865 | 2/1980 | Bjarsch | 99/327 |
| 4,510,376 | 4/1985 | Schneider | 219/492 |
| 4,755,656 | 7/1988 | Charlesworth et al. | 219/492 X |
| 4,878,423 | 11/1989 | Bikert et al. | 99/391 |
| 5,018,437 | 5/1991 | San Juan | 99/327 |

FOREIGN PATENT DOCUMENTS

| | | |
|---|---|---|
| 90 14 527 | 3/1991 | Germany . |
| 380255 | 9/1964 | Switzerland . |

*Primary Examiner*—Timothy F. Simone
*Attorney, Agent, or Firm*—Pillsbury Madison & Sutro

[57] ABSTRACT

In a toaster having a housing, a bread-supporting carriage movably mounted in the housing for movement between a toasting position, a temperature-maintaining position, a rest position and a supplementary raised position, and a spring coupled with the carriage to apply a force which urges the carriage in a direction from the toasting position toward the supplementary raised position, a manually operable control element is operatively associated with the carriage and is movable to a selected one of a plurality of control positions for retaining the carriage at a selected one of the temperature-maintaining position and the rest position.

7 Claims, 4 Drawing Sheets

TOASTER WITH MULTIPLE POSITIONS FOR THE BREAD CARRIER

BACKGROUND OF THE INVENTION

The present invention relates to the field of household electric cooking appliances of the toaster type.

The invention concerns more particularly a toaster having a bread supporting carrier, or carriage, which can be disposed or maintained at different elevations in the toasting enclosure, even after completion of the toasting operation.

A known toaster, as disclosed in U.S. Pat. No. 5,018,437, is provided with a system for maintaining food products at a warm temperature, in which articles to be toasted remain for a certain time in the toasting enclosure after completion of the toasting operation.

Such toasters are provided with a mechanism for blocking the carrier in a given position and the user can deactivate the blocking action at any moment.

Other known toasters are provided with a supplementary lifting system which permits, through the intermediary of a specific activation of the carriage, a displacement of the carriage toward the bread introduction slot. This permits a better gripping of small slices of bread at the end of toasting, without having to utilize any tools to recover such slices.

BRIEF SUMMARY OF THE INVENTION

An object of the present invention is to combine the above-described functions in a manner to provide a toaster whose carriage is capable of occupying several positions, at the user's option, without the user having to manually move the carriage toward one or the other of its positions, and particularly toward the supplementary raised position.

Another object of the present invention is to provide such a system with a reduced number of mechanical parts, which are equally arranged in a simple manner, to optimize the operation of the toaster.

A further object of the present invention is to simplify the various constituent parts of the toaster and in particular those which relate to the displacement of the carriage, in order to substantially reduce the fabrication cost of such toaster.

The above and other objects are achieved, according to the present invention, in a toaster having a housing, a bread-supporting carriage movably mounted in the housing for movement between a toasting position, a temperature-maintaining position, a rest position and a supplementary raised position, and a spring coupled with said carriage to apply a force which urges the carriage in a direction from the toasting position toward the supplementary raised position, by the provision of a manually operable control element which is operatively associated with said carriage and is movable to a selected one of a plurality of control positions for retaining said carriage at a selected one of the temperature-maintaining position and the rest position.

DETAILED DESCRIPTION OF THE INVENTION

Figure 1:
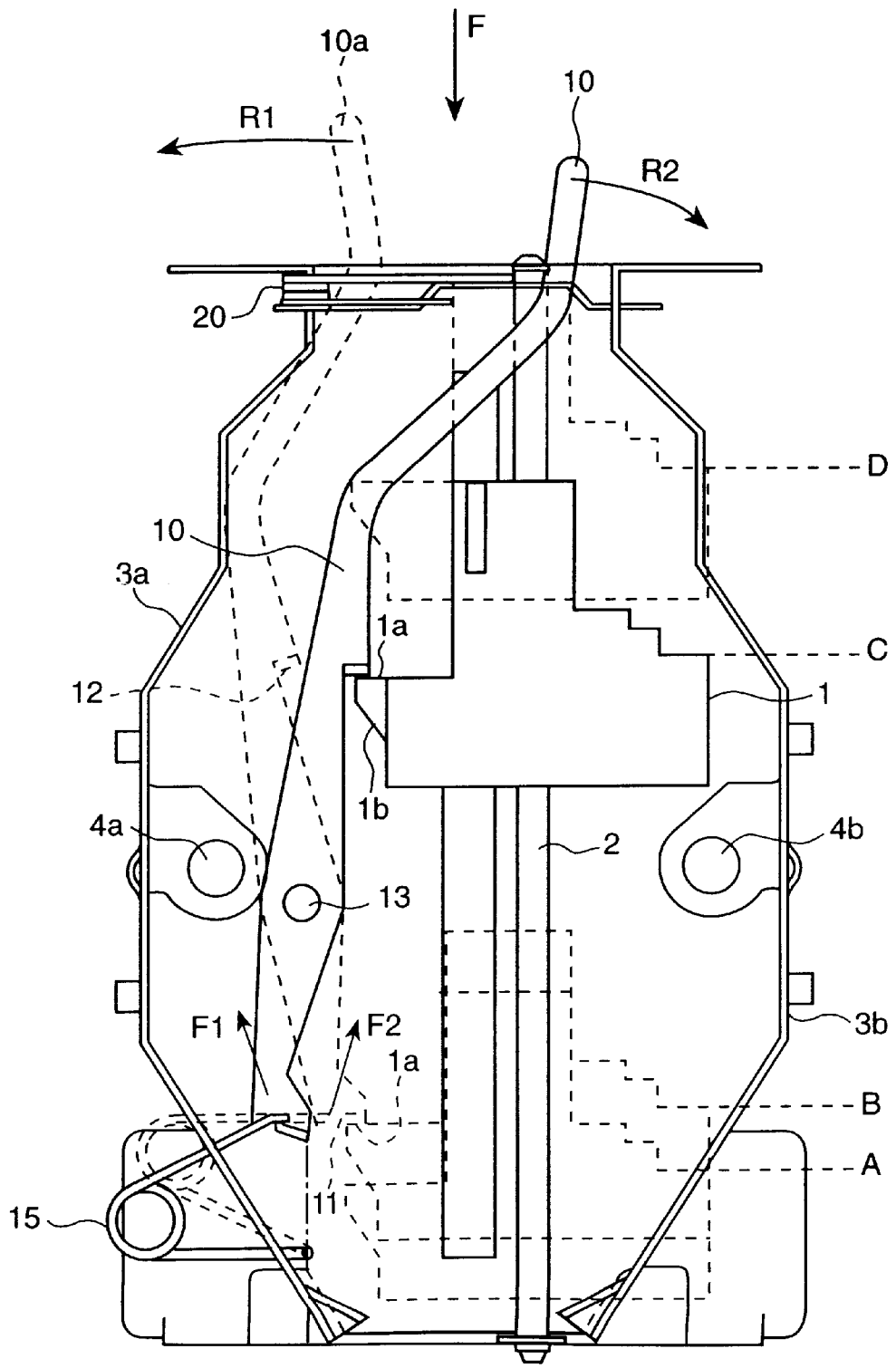
FIG. 1 is a simplified pictorial view, in cross-section, of an embodiment of a toaster according to the invention.

Referring first to FIG. 1, this shows, in a simplified pictorial form, different possible elevations, within a toasting enclosure, for a bread supporting carriage 1, which is mounted to be displaced along a guide rod, or shaft, 2 which is fixed to the toaster housing.

Carriage 1 can thus be disposed in a toasting position A, a temperature maintaining position B, a rest position C, or a supplementary raised position D.

Carriage 1 is displaced, or is held at a given level in the toasting enclosure, between heat reflectors 3a and 3b, associated with heating elements 4a and 4b.

The toaster represented particularly in FIG. 1 also includes control means which permits the user to undertake a control of the upward movement of carriage 1.

This control means permits carriage 1 to be held in any one of positions B, C or D, corresponding respectively to the temperature maintaining position, the rest position, or the supplementary raised position.

During a toasting operation, carriage 1 is brought into its lowest possible position, which is the toasting position A. Such a positioning is effected in general against the force of a restoring spring which is capable of driving carriage 1 upwardly along a guide rod 2.

Maintenance of carriage 1 in position A is achieved by any known means, and in particular with the aid of a mechanism which is controlled directly or indirectly by an electromagnet. Movement of carriage 1 into position A can also serve to close an electric switch in order to supply heating current to elements 4a and 4b.

Control means for retaining carriage 1 in either selected one of positions B and C are constituted by a lever 10 having at least two abutment surfaces 11 and 12, each of which can be positioned to halt carriage 1 during its upward movement. Lever 10 is supported by a pivot pin 13 which is mounted in the toaster, preferably on a lateral wall of the toaster housing or on one of the reflectors 3a, 3b.

Figure 2:
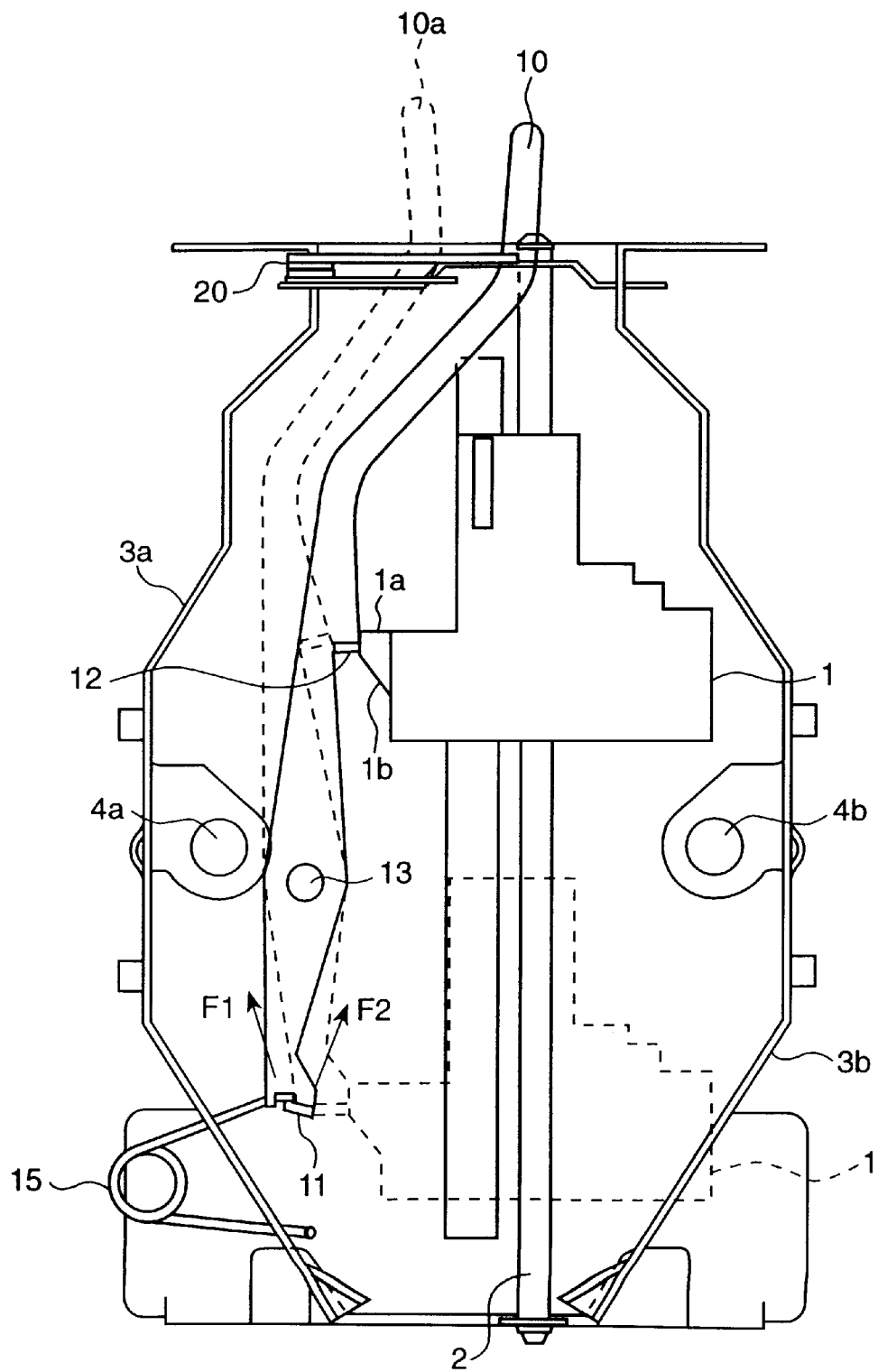
FIG. 2 is a view similar to that of FIG. 1 showing the carriage of the toaster in a position different from that shown in FIG. 1.

Abutment surfaces 11 and 12 are spaced apart vertically along lever 10, abutment surface 11 being located at the lower end of lever 10 and abutment surface 12 being located above pivot pin 13, and thus at a higher elevation than abutment surface 11. Lever 10 can be displaced or pivoted in the two directions R1 or R2, as shown in FIG. 1. This displacement is effected manually by the user. In each of FIGS. 1 and 2, two possible positions are shown, one in solid lines and one in broken lines. The position shown in solid lines in FIG. 1 represents the end point of pivotal movement in the direction R2. If lever 10 is brought into that position at a time when carriage 1 is below position C, then during subsequent upward movement carriage 1 will come to engage abutment surface 12, thereby retaining carriage 1 in position C. For engagement with the abutment surface 12, carriage 1 is provided with a laterally projecting edge 1a.

Since edge 1a faces upwardly, it will come to engage with abutment surface 11, or 12, in the course of upward movement of carriage 1.

Carriage 1 also has a beveled edge 1b located below, and facing away from, edge 1a. During downward movement of carriage 1, edge 1b is able to slide along any element of lever 10 so as to deflect lever 10 in a manner such that lever 10 will not interfere with downward movement of carriage 1. A point in such downward movement is shown more precisely in FIG. 2, which shows one possible position of carriage 1 in solid lines and another possible position thereof in broken lines.

When lever 10 has been pivoted in the direction of R1, into the position as shown in broken lines in FIG. 1 and carriage 1 is below position B, then during subsequent upward movement of carriage 1, abutment surface will come to engage edge 1a in to order block, or retain, carriage 1 in position B. The displacement movement from toasting position A to temperature keeping position B is sufficient to open, or otherwise actuate, the electric switch which supplies current to heating elements 4a and 4b in order to either turn off or reduce the supply of heating current to elements 4a and 4b. Lever 10 can also be positioned in a manner to not interfere with the upward movement of carriage 1, in order to allow carriage 1 to move upwardly to its supplementary raised position D after a toasting operation has been completed. A supplementary raised position D is particularly desirable in the case of food products of small size. Advantageously, lever 10 is mounted to pivot in opposition to a restoring force produced by a pivot spring 15. In FIG. 1, two positions of spring 15 are shown, one in solid lines and one in broken lines. These, in fact, represent two edge positions in the path displacement of spring 15. When lever 10 has been pivoted in the direction R2, spring 15 exerts a force F1 on the lower end of lever 10, to maintain lever 10 in the end position of movement in direction R2. When, on the other hand, lever 10 has been pivoted in the direction R1 and has moved past a dead center position, spring 15 exerts a force F2 on the lower end of lever 10, which force extends in a direction to maintain, or urge, lever 10 towards the end of its travel path in the direction R1. When lever 10 is in this latter position, spring 15 is in the broken line position as shown in FIG. 1.

Figure 3:
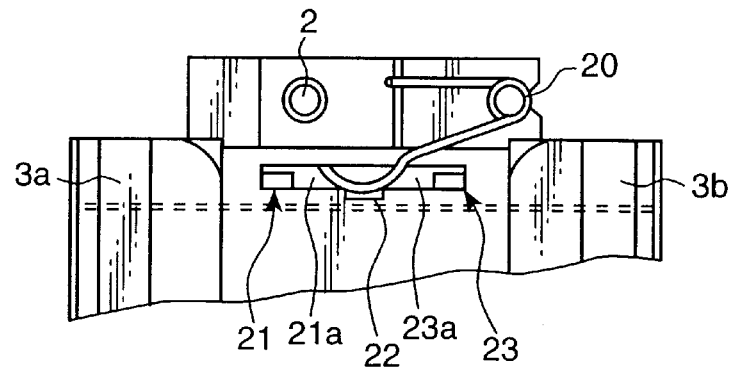
FIG. 3 is a detailed view taken in the direction of arrow F in FIG. 1.

Preferably, one extremity 10a of lever 10 projects out of the toaster housing and is associated with an indexing system such as shown, for example, in FIG. 3. Such a system facilitates movement of lever 10 into a selected one of a plurality positions 21, 22, 23, corresponding, respectively, to positions B, D, and C of carriage 1.

The indexing system includes, for example, a hairpin spring 20 having a free end which is disposed to retain lever 10 in a central position 22 which allows carriage 1 to reach the supplementary raised position D.

Advantageously, the indexing system includes a recess in which lever 10 will be retained, or latched, when lever 10 is in the central position 22.

The positioning of lever 10, when in either one of the end positions 21 and 23, permits lever 10 to pivot by a small amount toward central position 22 whenever carriage 1 is being lowered toward toasting position A. Such small amount of movement is sufficient to permit abutment surface 11 or 12 to be deflected by lower edge 1b during downward movement of carriage 1.

Thus, during the descending movement of carriage 1, edge 1b can come in contact with lever 10 in a manner which will not prevent further descending movement of carriage 1. The positioning of lever 10 at either one of positions 21 and 23 is stabilized by the action of spring 15, which is shown in greater detail in FIG. 4.

Thus, the indexing system includes free zones 21a and 23a which permit the deflection of lever 10 during downward movement of carriage 1, in response to the force exerted by lower edge 1b on either one of abutment surfaces 11 or 12.

Figure 4:
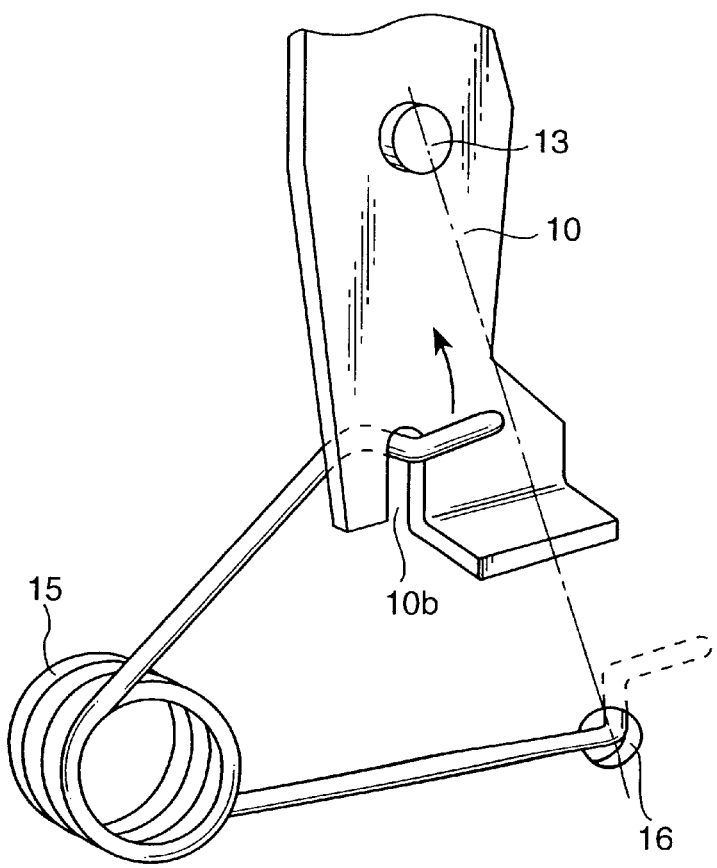
FIG. 4 is a perspective, detail view of control elements of the toaster according to the present invention.

FIG. 4 shows one example of a suitable manner of connection between the lower end of lever 10 and locking spring 15. One extremity of spring 15 is housed in a cutout 10b at the lower end of lever 10. The other extremity of spring 15 is retained in a hole, or bore, formed either in the housing or the reflector 3a of the toaster.

Other arrangements for the connection between spring 15 and lever 10 can equally be envisioned without departing from the scope of the present invention.

One advantage of a toaster according to the invention resides in the simplicity and ease with which its operation can be controlled by appropriately positioning lever 10, prior to a toasting operation, in order to determine the height to which carriage 1 can be raised at the end of the toasting operation.

Advantageously, a toaster according to the invention can also be provided with a system permitting a gentle or cushioned raising movement of carriage 1. Such systems are known in the form of damping springs, bellows or pistons from which air escapes, thus assuring the prevention of shocks during upward movement of carriage 1, under the influence of the restoring spring (not shown). Certain systems of this type are commonly termed "Dash-Pot".

Figure 5:
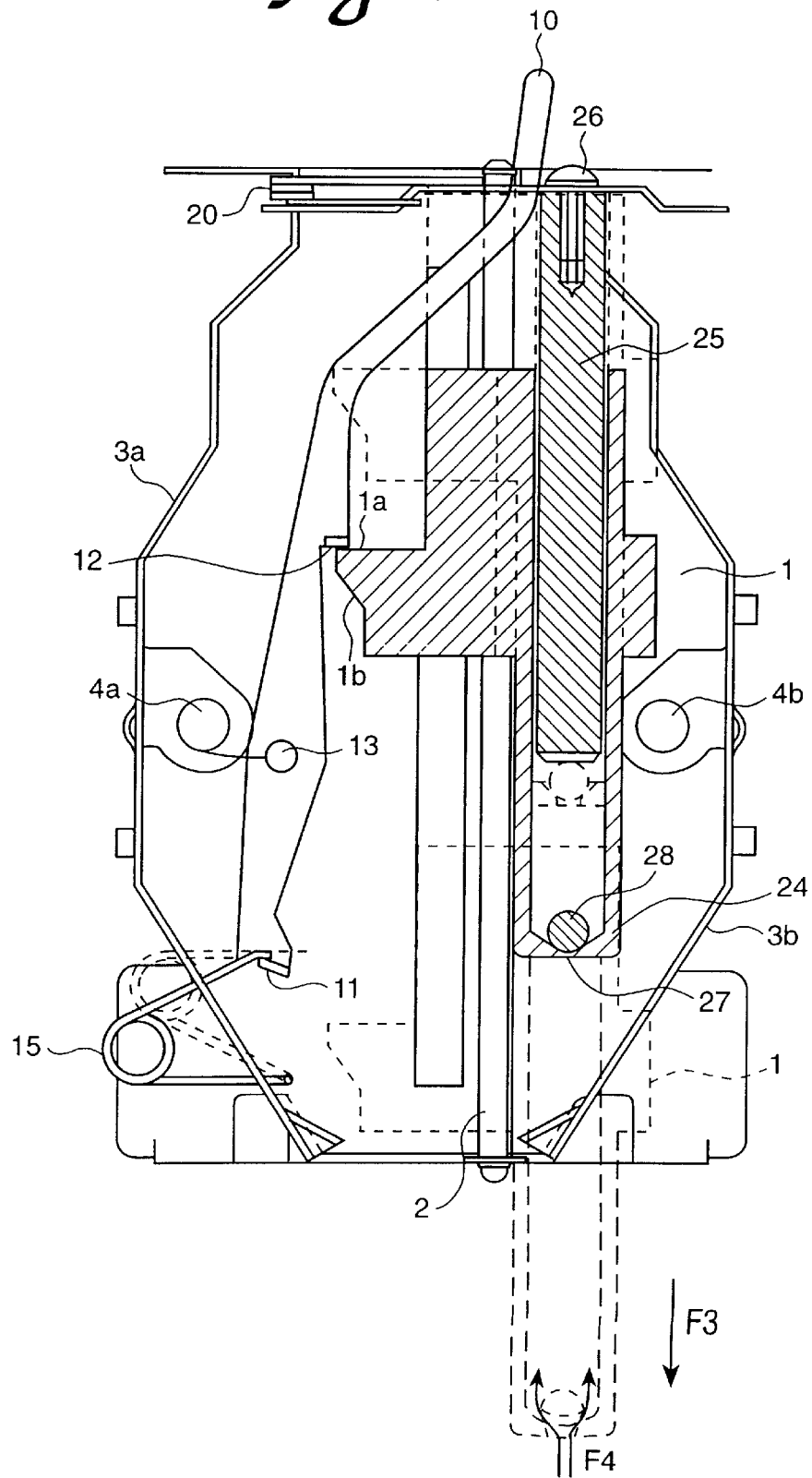
FIG. 5 is a view similar to those of FIGS. 1 and 2 showing an alternative embodiment of the invention.

FIG. 5 shows such a system in the form of a piston-cylinder unit from which air can escape. Such a system is constituted by a cylinder 24 formed by being molded together with carriage 1, as well as a piston 25 fixed to a plate which is attached to the toaster housing by a screw 25 or any other equivalent means. A certain play is provided between piston 25 and cylinder 24, the amount of which determines the slowing that will be achieved. Slowing of upward movement of carriage 1 is in effect assured by an air lamina between cylinder 24 and piston 25. The lower end of cylinder 24 has an opening 27 which is blocked by a ball 28 when ball 28 rests, under the influence of gravity, against the lower end of cylinder 24. During descent of carriage 1 in the direction of arrow F3 toward the toasting position, cylinder 24 moves downwardly relative to piston 25 and ball 28 will be lifted away from opening 27 as a result of the pressure reduction within cylinder 24 and thus allows air to pass through opening 27 in the direction of arrows F4 and into cylinder 24. The provision of ball 28, or other type of one-way valve, assures that the system for slowing upward movement of carriage 1 does not interfere with, and in particular does not have a slowing effect on, downward movement of carriage 1.

Another advantage of toasters according to the invention resides in the fact that they do not require any electric mechanism, such as those including a supplementary relay, to block housing 1 during its upward movement. As a result, the cost for fabricating such toasters is substantially less than it is for conventional toasters.

While the description above refers to particular embodiments of the present invention, it will be understood that many modifications may be made without departing from the spirit thereof. The accompanying claims are intended to cover such modifications as would fall within the true scope and spirit of the present invention.

The presently closed embodiments are therefore to be considered in all respect as illustrative and not restrictive, the scope of the invention being indicated by the appended claims, rather than the foregoing description, and all changes which come within the meaning and range of equivalency of the claims are therefore intended to be embraced therein.

I claim:

1. In a toaster having a housing, a bread-supporting carriage movably mounted in the housing for movement between a toasting position, a temperature-maintaining position, a rest position and a supplementary raised position, and a spring coupled with said carriage to apply a force which urges the carriage in a direction from the toasting position toward the supplementary raised position, the improvement comprising a manually operable control element which is operatively associated with said carriage and is movable to a selected one of a plurality of control positions for retaining said carriage at a selected one of the temperature-maintaining position and the rest position.

2. The toaster according to claim 1 wherein said control element is operative to block said carriage in a selected one of the temperature-maintaining position and the rest position, and is movable to allow said carriage to move to the supplementary rest position.

3. The toaster according to claim 2 wherein said control element is a pivotally mounted lever having two abutment members each located to block said carriage in a respective one of the positions.

4. The toaster according to claim 3 further comprising a spring coupled to said lever for applying a biasing force to said lever.

5. The toaster according to claim 4 wherein said lever has an extremity which is located outside of said housing in order to be manually accessible and is pivotable between a first lever position for blocking said carriage in the temperature-maintaining position, a second lever position for blocking said carriage in the rest position, and a third lever position for permitting said carriage to move to the supplementary raised position, and said toaster further comprises an indexing system which cooperates with said lever to provide an indication of each lever position.

6. The toaster according to claim 3 wherein said lever has an extremity which is located outside of said housing in order to be manually accessible and is pivotable between a first lever position for blocking said carriage in the temperature-maintaining position, a second lever position for blocking said carriage in the rest position, and a third lever position for permitting said carriage to move to the supplementary raised position, and said toaster further comprises an indexing system which cooperates with said lever to provide an indication of each lever position.

7. The toaster according to claim 1 further comprising a system for controlling movement of said carriage in order to protect said carriage against sudden changes in speed.

* * * * *